United States Patent [19]

Buckingham

[11] 4,296,061

[45] Oct. 20, 1981

[54] THERMOPLASTIC GOB FEEDING AND TRANSFER METHOD AND APPARATUS

[75] Inventor: James W. Buckingham, Pemberville, Ohio

[73] Assignee: Owens-Illinois, Inc., Toledo, Ohio

[21] Appl. No.: 131,712

[22] Filed: Mar. 19, 1980

[51] Int. Cl.³ ............................................. B29B 5/06
[52] U.S. Cl. ................................... 264/138; 65/303; 65/304; 264/145; 264/148; 264/238; 264/297; 264/299; 264/309; 425/256; 425/261; 425/308; 425/447; 425/809
[58] Field of Search .............. 425/215, 256, 258, 259, 425/447, 809, 261, 308; 264/5, 142, 144, 148, 297, 309, 138, 145, 238, 299; 65/165, 303, 304, 325, 326, 334; 198/560, 803; 83/343

[56] References Cited

U.S. PATENT DOCUMENTS

| | | | |
|---|---|---|---|
| 1,712,327 | 5/1929 | Brooke | 65/303 |
| 2,199,356 | 4/1940 | Brown | 65/303 |
| 3,053,221 | 9/1962 | Heffley et al. | 425/809 |
| 3,162,522 | 12/1964 | Tingley | 65/304 |
| 3,198,616 | 8/1965 | Havens | 65/304 |
| 3,431,830 | 3/1969 | Stovall | 83/343 |
| 4,002,451 | 1/1977 | Knapp et al. | 65/303 |

*Primary Examiner*—James B. Lowe

*Attorney, Agent, or Firm*—John R. Nelson; Myron E. Click; David H. Wilson

[57] ABSTRACT

The invention provides an improved method and apparatus for effecting the severing of successive gobs from a continuously extruded rod-like formation of organic thermoplastic material, followed by the successive transfer of the gobs to successive molding units which are continuously movable relative to the free-fall path of the gobs. Severing means are provided which are operative upon a vertically extruded rod-like formation of hot organic thermoplastic material. A plurality of molding members, each having an open top molding cavity, are moved in timed relationship to the gob severing means along a horizontal path adjacent to the free fall path of the severed gobs. Each gob is caught by a transfer device which is movable under the free-fall path of the gobs in timed relationship to the gob severing and the movement of the molding members. The transfer device effects the lateral displacement of each gob deposited on its top surface and then a stationary deflecting device moves the gob off the surface of the transfer device and drops it into the open top molding cavity of the moving molding members. Cooling of the transfer plate and deflector provides an identical thermal history for each gob.

9 Claims, 5 Drawing Figures

THERMOPLASTIC GOB FEEDING AND TRANSFER METHOD AND APPARATUS

BACKGROUND OF THE INVENTION

The compression molding technique has heretofore been utilized in connection with the molding of organic thermoplastic articles from a heated gob of material. If only a single molding cavity is employed, there is little problem in dropping the gob into the cavity and effecting the compression molding of the gob; however, when a plurality of continuously moving molding members are employed, it is necessary that a plurality of identical gobs be successively formed and respectively deposited in the molding cavities in timed relationship to the arrival of the molding cavities at the point of deposit and with each gob having an identical thermal history. If the successive gobs of heated organic thermoplastic material are formed by successive severing operations on a vertically extruded, rod-like formation of such material, it is readily apparent that the arrival of the successive gobs at a particular horizontal plane is dependent upon the free-fall time of the gobs. Since the heated organic thermoplastic material is relatively tacky, there are minute differences in the severing time of successive gobs and, even though the gob shears be actuated according to a desired timed sequence, this provides no assurance that the freely-falling gobs will arrive at a particular vertical elevation in exactly the same time sequence as the shears are operated.

There is, accordingly, a need for a gob shearing and transfer method and mechanism which will positively deposit successive gobs in successive molding cavities of successive continuously moving molding members in a desired timed sequence which coincides with the arrival of the molding members at a particular point.

SUMMARY OF THE INVENTION

The invention provides an improved method and apparatus for effecting the severing of successive gobs from a continuously extruded rod-like formation of organic thermoplastic material, followed by the successive transfer of the gobs to successive molding units which are continuously movable relative to the free-fall path of the gobs. Severing means are provided which are operative upon a vertically extruded rod-like formation of hot organic thermoplastic material. A plurality of molding members, each having an open top molding cavity, are moved in timed relationship to the gob severing means along a horizontal path adjacent to the free fall path of the severed gobs. Each gob is caught by a transfer device which is movable under the free-fall path of the gobs in timed relationship to the gob severing and the movement of the molding members. The transfer device effects the lateral displacement of each gob deposited on its top surface and then a stationary deflecting device moves the gob off the surface of the transfer device and drops it into the open top molding cavity of one of the moving molding members. The utilization of a transfer device driven in positive synchronism with the molding members assures that the time of deposit and location of the successive gobs in the successive molding cavities will not be dependent on variations in the free-fall time of the successive gobs. Cooling of the transfer plate and deflector provides an identical thermal history for each gob.

It is, accordingly, an object of this invention to provide an improved gob-shearing and transfer method and apparatus for effecting the feeding of molding cavities of a multi-cavity compression molding machine in a desired timed sequence.

A particular object of this invention is to provide a transfer mechanism for successive free-falling gobs of hot organic thermoplastic material which intercepts the gobs and effects the transfer of the gobs in a desired timed sequence to successive molding cavities of a plurality of molding members which successively move past a given point adjacent to the transfer member.

Other objects and advantages of this invention will be apparent to those skilled in the art from the following detailed description, taken in conjunction with the annexed sheets of drawings on which is shown a preferred embodiment of this invention.

DESCRIPTION OF PREFERRED EMBODIMENT

Figure 1:
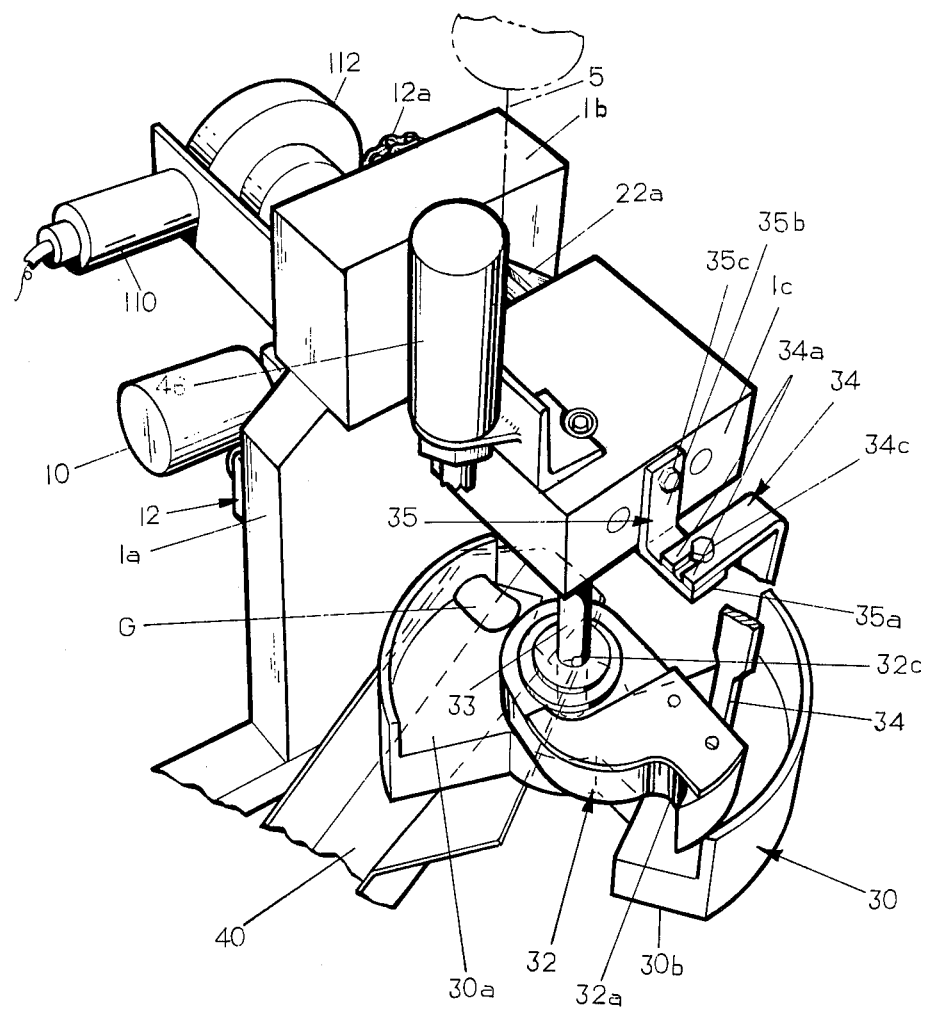
FIG. 1 is a schematic perspective view of a gob feeding apparatus embodying this invention which is specifically designed for the successive deposit of gobs of molten thermoplastic material into successive molding cavities.
Figure 1A:
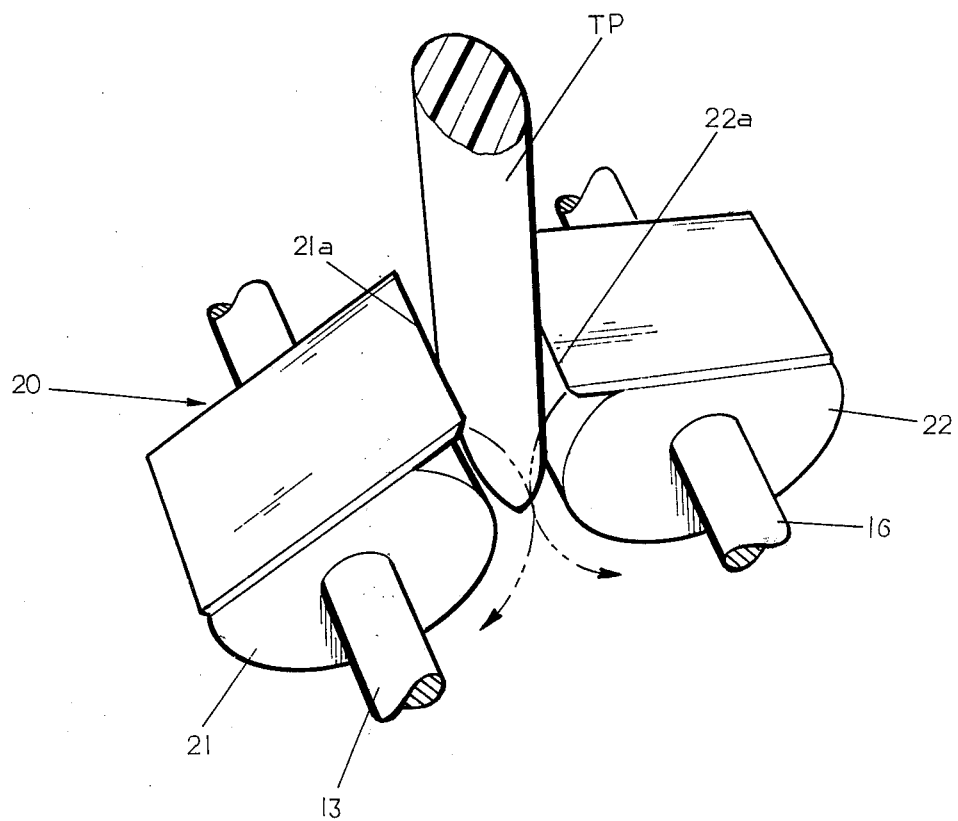
FIG. 1a is a schematic perspective view illustrating the gob cutting step.

Referring now particularly to FIG. 1, a gob-serering and transfer apparatus embodying this invention will be seen as comprising a drive motor 10 which provides motive power for all of the moving parts of the apparatus through gearing connections therewith, thereby assuring the synchronous operation of the various moving parts. The drive motor 10 provides driving power for a gob-shearing apparatus 20 defined by a pair of co-operating rotating shear elements 21 and 22 which have eccentrically disposed cutting blades 21a and 22a which rotate into abutting engagement and pass through a dependent rod of heated thermoplastic material TP (FIG. 1a) which is being continuously issued in a rod-like formation from an extruder or any other form of feeder capable of producing a rod-like formation of molten thermoplastic material. Thus each rotation of the gob shearing elements 21 and 22 effects the production of a gob G of thermoplastic material which then falls vertically downwardly along a path coincident with line 5 onto the horizontal surface 30a of a rotating cup shaped transfer table 30 whose periphery passes under the gob fall path. While transfer table 30 is of generally circular form, its top surface 30a is provided with two segment-shaped cut-outs 30b and 30c which are in diametrically opposed relationship. Cut-outs 30b and 30c pass in each rotation successively over the top open end of a gob chute 40 and, on the opposite side of the transfer table 30, over the open end of a molding cavity 50a of one of a plurality of molds 50 which are successively moved into a position of vertical alignment beneath the path of the cut-out segments 30b and 30c and horizontally spaced from the free-fall path 6 of the severed gobs G.

Figure 3:
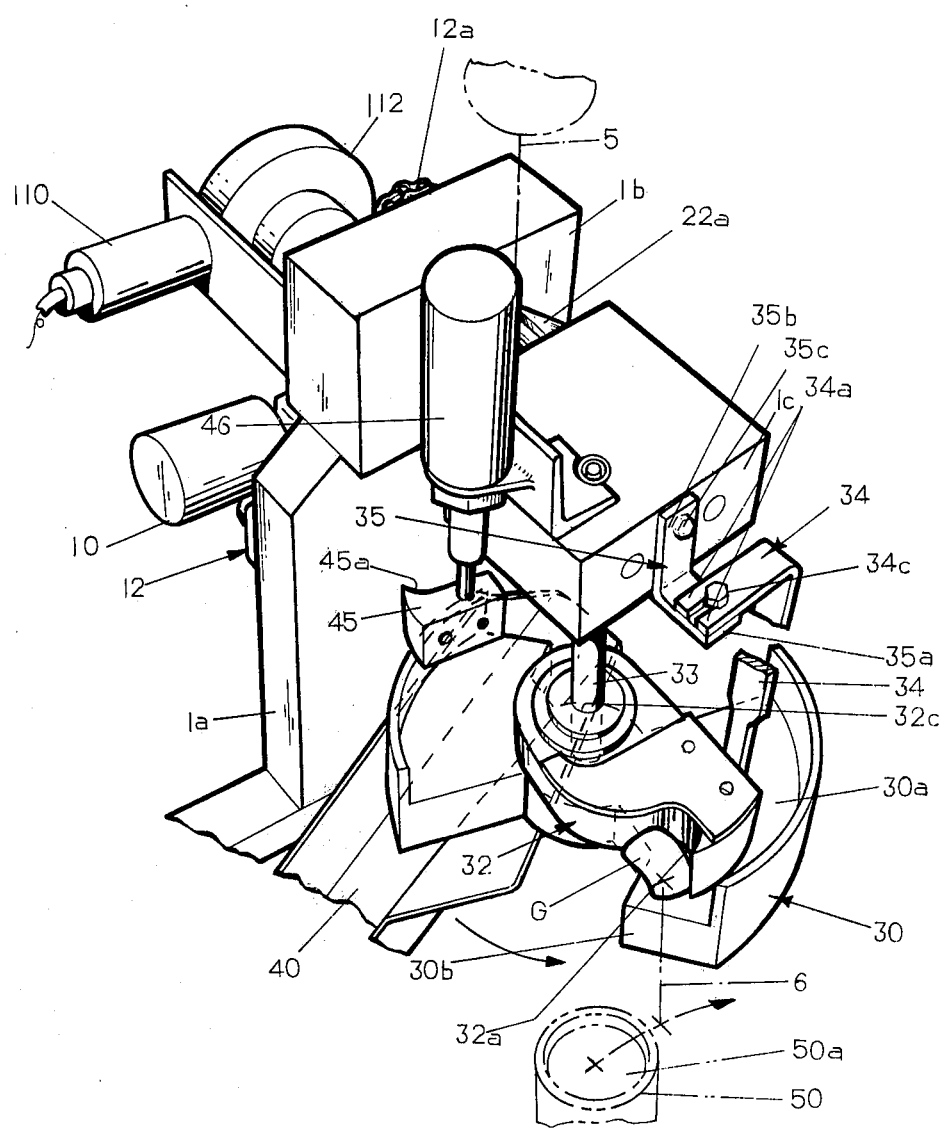
FIG. 3 is a schematic perspective view of a portion of the apparatus of FIG. 1 illustrating the removal of the gob from the transfer table for deposit by free-fall into a molding cavity.
Figure 4:
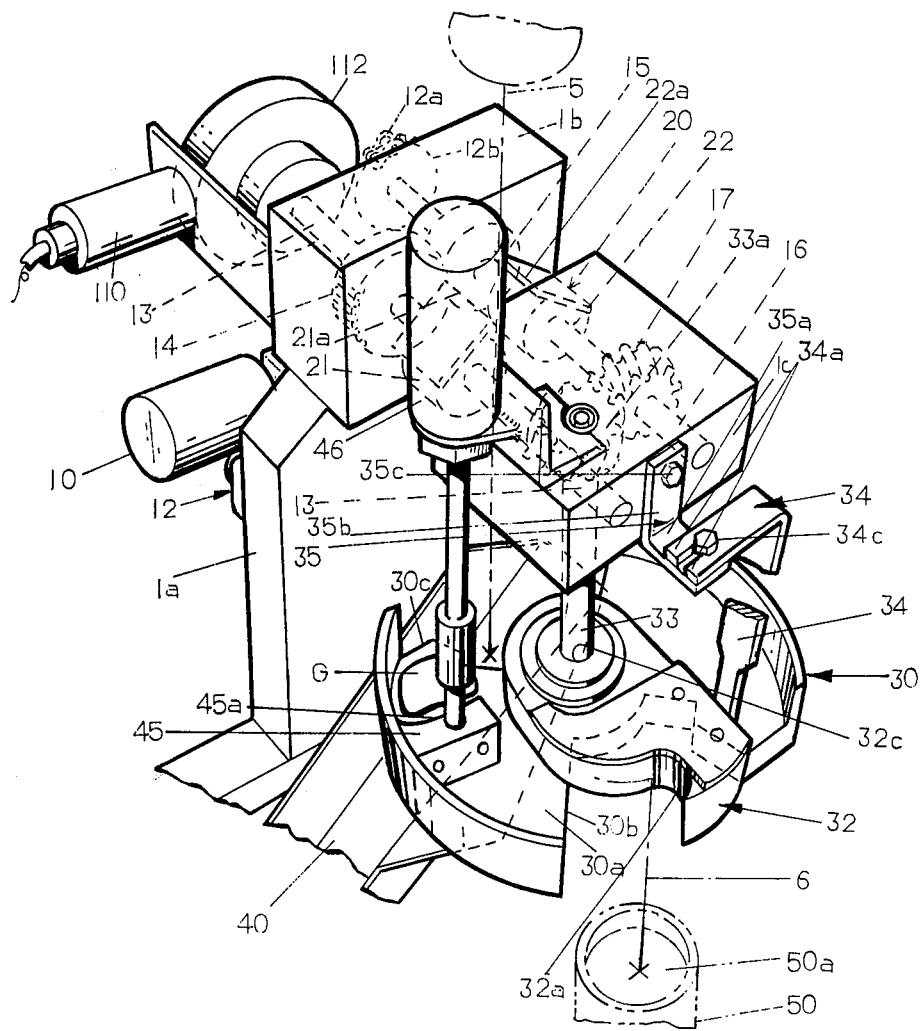
FIG. 4 is a view similar to FIG. 3 but illustrating the diversion of a gob carried by the transfer table into a cullet chute.

In the normal operation of the transfer plate 30, a severed gob G of molten thermoplastic material is deposited on the horizontal surface 30a and moved laterally by the rotation of the transfer table 30 to a position directly overlying the open top mold cavity 50a where it is engaged by a fixed gob transfer deflector 32 and pushed off surface 30a to fall through either the open segment 30b or 30c into the open top molding cavity 50a. On the other hand, if it is desired to interrupt the deposit of successive gobs G of molten thermoplastic material into the molding cavities 50a of the successive molding elements 50, then a cullet scraper block 45 (FIG. 3) is lowered by a solenoid 46 into sliding engagement with the top surface 30a of the mold transfer table 30, and this element engages the deposited gob G as the table 30 rotates and scrapes it off the mold transfer surface 30a to fall thru open segment 30b or 30c into the exposed upper end of the cullet chute 40.

In order to provide each successive gob G that is deposited in a molding cavity 50a with an identical thermal history, the gob receiving top surface 30a of the mold transfer table 30 is maintained at a pre-determined temperature through the circulation of a suitable cooling fluid through the hollow interior of the rotary table 30. Additionally, the gob transfer deflector 32 is formed of a hollow configuration and the arcuate gob engaging surface 32a of the transfer element 32 is maintained at a pre-determined temperature through the circulation of cooling fluid to the hollow interior of the gob transfer deflector 32.

It is therefore apparent that the aforedescribed apparatus effects the feeding of a freely-falling gob of heated theremoplastic material to a molding cavity by first intercepting the freely-falling gob with a transfer surface 30a that is continuously moving, i.e. rotating or oscillating, in a horizontal plane. The gob is then moved solely by the movement of the transfer surface 30a to a position that is horizontally spaced from the free-fall path of the gob and the gob is then deflected from the moving transfer surface to fall into a molding cavity of a mold element that is positioned in the path of freefall 6 of the gob. All portions of the transfer surface 30a and the deflector element 32 that contact the successive gobs are maintained at a pre-selected temperature so that the thermal history of each gob deposited in a molding cavity is identical, thereby assuring that the resultant plastic articles molded in the successive molds will have no variations attributable to differences in thermal history of the gobs deposited in the successive molds.

A more detailed description of the elements of the apparatus shown in the drawings will now be presented. The motor 10 providing the motive power for the drive mechanism may be an ordinary electric motor driven in conventional manner from a power source. In such event, then a synchronizing clutch (not shown) will have to be provided between the gob feeder drive mechanism and the molding machine which governs the movement of the successive molds 50 into a position to receive the successive severed gobs of thermoplastic material. Alternatively, the motor 10 may be replaced by a direct drive connection from the mechanism controlling the movement of the successive molds 50.

An appropriate molding machine for use with the gob feeding apparatus of this invention is described and claimed in the co-pending application of Stephen W. Amberg and Ralph G. Amberg Ser. No. 131713, filed concurrently with this application, and of common ownership and reference may be had to such application for detailed information concerning the molding apparatus which governs the positioning of the successive molds 50 in timed and spaced relationship to the operation of the gob severing mechanism 20.

In the apparatus shown in the drawings, the motor 10 drives a gear-reduction transmission unit 12. Transmission unit 12 has an output sprocket (not shown) which drives a chain 12a which in turn drives a sprocket 12b on a horizontally disposed drive shaft 16. A parallel drive shaft 13 is driven by shaft 16 through cooperating gears 14 and 15. The gob shearing elements 21 and 22 are respectively secured to the drive shafts 13 and 16.

Figure 2:
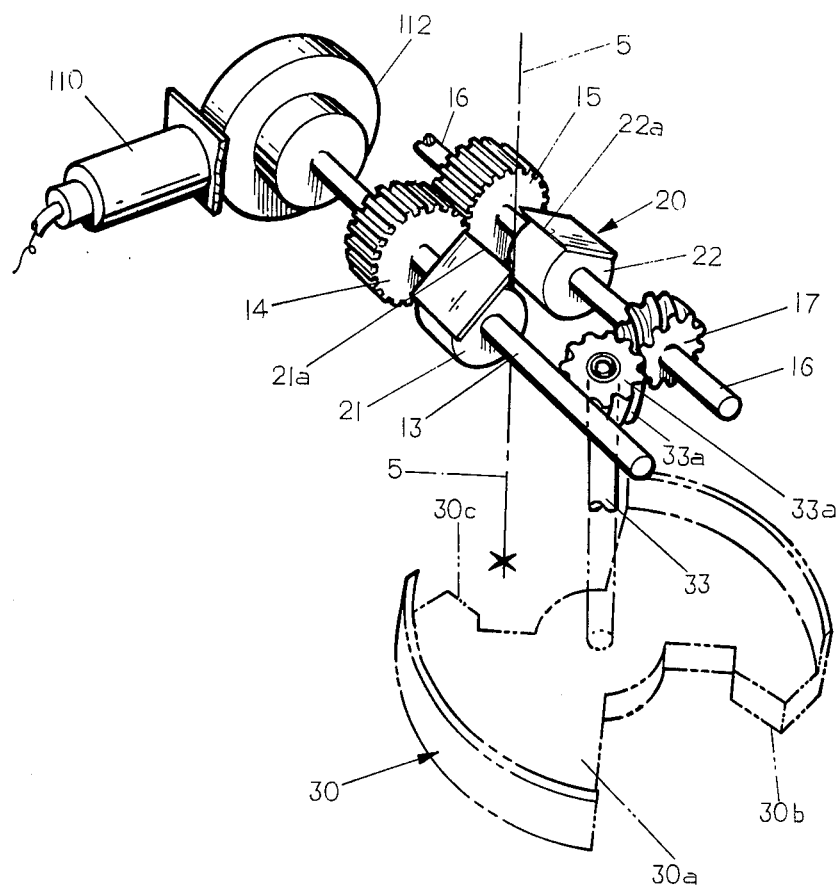
FIG. 2 is a schematic view, with major portions of the apparatus removed to more clearly illustrate the driving mechanism for the apparatus of FIG. 1.

The shaft 13 also drives a rotating plastic timing disc 112 past a conventional proximity switch 110. Switch 110 is connected in parallel circuit relationship with the stop-start control for the motor 10. A magnetic button (not shown) on plastic disc 112 locates the proper stop location of the shaft 13 to insure that when the motor 10 is stopped, the shear blades 21a and 22a, and the transfer table 30 are all disposed in their open positions as shown in FIG. 2, so that any additional molten thermoplastic material produced by the extruder falls freely into the cullet chute 40.

Shafts 13 and 16 are journalled in conventional fashion by appropriate bearing elements provided on a frame structure of the machine which is schematically indicated by the block elements 1a, 1b and 1c respectively. Thus the gob-cutting blades 21a and 22a are driven in synchronism and come into abutting contact once during each rotation of the shafts 13 and 16, thereby effecting a complete severing of a gob G from the rod-like formation TP of molten thermoplastic material entering the apparatus from an extruder (not shown) or similar source positioned there above.

Rotary transfer table 30 is supported for rotation by a vertical shaft 33 which is suitably journalled by bearings (not shown) provided in frame block 1c and is driven by helical gear 33a which in turn is driven by helical gear 17 mounted on the shaft 16. Thus the rotation of the transfer table 30 is in timed relationship to the operation of the gob-shearing mechanism 20 is assured.

As previously indicated, the hollow gob transfer deflector 32 is stationary and therefore has a bore 32c freely surrounding the drive shaft 33. Deflector 32 is supported in a fixed angular position relative to the drive shaft 33 by a depending L-shaped bracket 34 which has a pronged end 34a resting on a horizontal arm 35a of L-shaped bracket 35 secured to frame block 1c by a suitable bolt 35c passing thru vertical arm 35b. An adjusting bolt 34c traverses the slot defined by the pronged end portion 34a and hence permits some angular adjustment of the position of the bracket 34, and hence of the gob transfer deflector 32, with respect to the axis of power shaft 33. More importantly, this permits alignment of the arcuate deflecting surface 32a of gob transfer deflector 32 directly above and preferably slightly in advance of the mold cavity 50a of the mold 50 which is passing beneath the transfer plate 30 in continuous motion. Hence the deflected gob G will be moved off the transfer plate surface 30a slightly prior to the time that the molding cavity 50a is in exact alignment with its vertical path of fall to permit the gob to land directly in the center of the molding cavity 50a by the further horizontal movement of mold 50 during the slight period of time required for the gob to fall from the transfer plate surface 30a into the molding cavity 50a. Thus the successive deposit of gobs is substantially the same position in the successive molding cavities 50a is thereby assured.

As previously mentioned, both the mold transfer table 30 and the gob deflector 32 are of hollow configuration to permit the circulation of a coolant fluid therethrough. The mechanism for effecting such circulation is entirely conventional and hence has not been specifically illustrated in the drawings. Naturally, a source of cooling fluid must be provided as well as a conduit for removing the heated fluid after it has passed through the hollow interiors of the gob transfer element 30 and the gob deflector element 32.

In the event it is desired that no gob be deposited in the molding cavities to permit repair or adjustments of the molding machine, a solenoid or fluid actuator 46 is energized by manually closing a switch (not shown) in an appropriate electrical circuit and this effects the lowering of cullet scraper block 45 into contact with the top gob receiving surface 30a of the gob transfer plate 30. The position of the scraper block 45 is directly over the open upper end of a cullet chute 40 and hence, each deposited gob G contacts the curved edge 45a of the scraper block 45 and is shifted by the scraper block to fall thru the segment opening 31a or 31b, as the case may be, thence to fall into the cullet chute 40, which transfers the gob of thermoplastic material to a suitable cooling and collecting chamber from which it may be subsequently re-claimed and re-used.

Modifications of this invention will be readily apparent to those skilled in the art and it is intended that the scope of the invention be determined solely by the appended claims.

What is claimed is:

1. Method of feeding a free falling gob of heated thermoplastic material to a molding cavity comprising the steps of:
   (1) intercepting the free fall of a gob with a transfer surface that is continuously moving in a horizontal plane;
   (2) moving the gob solely by the movement of the transfer surface to a position horizontally spaced from the free fall path of the gob, and
   (3) deflecting the gob from the moving transfer surface to fall into a molding cavity.

2. The method of feeding successive free falling gobs of heated thermoplastic material to successive molding cavities, comprising the steps of:
   (1) intercepting the free fall of each gob with a continuously horizontally moving transfer surface:
   (2) moving each gob solely by the movement of the transfer surface to a position horizontally spaced from its free fall path, and
   (3) deflecting each successive gob from the moving transfer surface into a molding cavity positioned below the transfer surface.

3. The method defined in claims 1 or 2 plus the step of maintaining the transfer surface at a pre-determined temperature, thereby imparting an identical thermal history to each successive gob.

4. A gob feeding mechanism for converting a continuously extruded rod-like formation of heated thermoplastic material into a series of identical weight gobs and delivering the gobs respectively to molding members, comprising, in combination, shearing means periodically contacting the thermoplastic formation to shear freely falling gobs therefrom, a transfer plate mounted beneath the shear member, means mounting said transfer plate for continuous horizontal rotational movement intersecting the free fall path of the gobs so that a portion of the transfer plate will periodically receive a falling gob thereon and move said gob horizontally solely by movement of the transfer plate, and means for deflecting the gob from the transfer plate into a molding member at a position horizontally spaced from the free fall path of the gobs.

5. A gob feeding mechanism for converting a continuously extruded rod-like formation of heated thermoplastic material into a series of identical weight gobs and delivering the gobs respectively to molding members, comprising, in combination, shearing means periodically contacting the thermoplastic formation to shear freely falling gobs therefrom, a transfer plate mounted beneath the shear members, means mounting said transfer plate for continuous horizontal movement intersecting the free fall path of the gobs so that a portion of the transfer plate will periodically receive a falling gob thereon, a plurality of molding members each having an open top molding cavity, means for moving said molding members successively beneath the path of movement of said transfer plate and in timed relationship to the movement thereof, and means for deflecting each gob on said transfer plate to fall into the open top molding cavity of a molding member passing beneath the transfer plate.

6. A gob feeding mechanism for converting a continuously extruded rod-like formation of heated thermoplastic material into a series of identical weight gobs and delivering the gobs respectively to molding members, comprising, in combination, a pair of shear members periodically contacting the thermoplastic formation to shear freely falling gobs therefrom, a cullet chute disposed beneath the path of the falling gobs, a transfer plate mounted intermediate the shear members and the cullet chute, means mounting said transfer plate for rotation about a vertical axis so that a peripheral portion of the transfer plate can periodically receive a falling gob thereon, a gob discharge aperture in said transfer plate peripheral portion, a plurality of molding members each having an open top molding cavity, means for moving said molding members successively beneath the path of said gob discharge aperture and in timed relationship to the rotation thereof, and means for deflecting each gob on said transfer plate into said gob discharge aperture to fall into the open top molding cavity of the molding member passing beneath the transfer plate.

7. The apparatus of claim 4, 5, or 6 plus means for cooling the gob contacting portions of said transfer plate to maintain same at a uniform temperature, and means for cooling said gob deflecting means to maintain same at a uniform temperature, thereby giving each successive gob transferred an identical thermal history.

8. The apparatus of claim 5 or 6 wherein said deflecting means comprises a stationary element overlying the path of the gob carrying portion of said transfer plate at a position adjacent to the underlying path of the molding members.

9. The apparatus of claim 6 plus selectively operable means for deflecting a gob deposited on said transfer plate into said cullet chute.

* * * * *